United States Patent
Oh et al.

(10) Patent No.: US 9,938,642 B2
(45) Date of Patent: Apr. 10, 2018

(54) PREPARATION METHOD FOR MULTIFUNCTIONAL POLYESTER FIBRE (71) Applicants: HYOSUNG CORPORATION, Seoul (KR); NANO-VISION TECH, Gyeonggi-do (KR)

(72) Inventors: Sung Jin Oh, Anyang-si (KR); Min Suk Lee, Anyang-si (KR); Young Un Oh, Seoul (KR)

(73) Assignees: Hyosung Corporation, Seoul (KR); Nano-Vision Tech Co., Ltd., Namyangju-si (KR)

( * ) Notice: Subject to any disclaimer, the term of this patent is extended or adjusted under 35 U.S.C. 154(b) by 400 days.

(21) Appl. No.: 14/438,798

(22) PCT Filed: Nov. 1, 2013

(86) PCT No.: PCT/KR2013/009844
§ 371 (c)(1),
(2) Date: Apr. 27, 2015

(87) PCT Pub. No.: WO2014/069935
PCT Pub. Date: May 8, 2014

(65) Prior Publication Data
US 2015/0292115 A1 Oct. 15, 2015

(30) Foreign Application Priority Data
Nov. 1, 2012 (KR) .................. 10-2012-0123184

(51) Int. Cl.
C08J 3/22 (2006.01)
D01F 1/08 (2006.01)
(Continued)

(52) U.S. Cl.
CPC ................ D01F 1/08 (2013.01); C08J 3/226 (2013.01); D01D 5/088 (2013.01); D01D 5/253 (2013.01);
(Continued)

(58) Field of Classification Search
CPC .. C08J 3/22; C08J 3/226; D01D 5/088; D01D 5/24; D01D 5/253; D01F 1/08; D01F 1/10; D01F 1/106; D01F 6/62; D10B 2331/04
(Continued)

(56) References Cited

U.S. PATENT DOCUMENTS

2008/0308775 A1* 12/2008 Yabuki .................. D01F 1/10
252/587

FOREIGN PATENT DOCUMENTS

EP 0302141 2/1992
JP 0369675 3/1991
(Continued)

OTHER PUBLICATIONS

Machine translation of KR 100792118 B1 (published on Jan. 4, 2008).*
(Continued)

Primary Examiner — Leo B Tentoni
(74) Attorney, Agent, or Firm — Hamre, Schumann, Mueller & Larson, P.C.

(57) ABSTRACT

The present invention relates to a method for producing a multifunctional polyester fiber, including: mixing a polyester master batch chip, containing cesium tungsten oxide-based particles, with a general polyester chip; spinning the mixture to form a spun fiber; and cooling the spun fiber using a cooling device having a rotational outflow quenching unit and a nozzle-warming heater, and to a fiber produced by the method. The multifunctional polyester fiber
(Continued)

according to the present invention exhibits excellent far-infrared emission properties, thermal storage/insulation properties, spinning processability, and dyeability.

5 Claims, 4 Drawing Sheets (51) Int. Cl.
| | |
|---|---|
| *D01D 5/088* | (2006.01) |
| *D01F 6/62* | (2006.01) |
| *D01D 5/253* | (2006.01) |
| *D01F 1/10* | (2006.01) |
| *D03D 15/00* | (2006.01) |
| *D04B 1/16* | (2006.01) |
| *D01D 5/24* | (2006.01) |

(52) U.S. Cl.
CPC ............... *D01F 1/106* (2013.01); *D01F 6/62* (2013.01); *D03D 15/0016* (2013.01); *D04B 1/16* (2013.01); *C08J 2367/00* (2013.01); *C08J 2467/00* (2013.01); *D01D 5/24* (2013.01); *D10B 2331/04* (2013.01); *D10B 2401/20* (2013.01)

(58) Field of Classification Search
USPC ............ 264/177.13, 210.6, 211, 211.14, 349
See application file for complete search history.

(56) References Cited

FOREIGN PATENT DOCUMENTS

| | | |
|---|---|---|
| KP | 20120076909 | 7/2012 |
| KR | 20110015319 | 2/2001 |
| KR | 20070085850 | 8/2007 |
| KR | 100792118 | 1/2008 |
| KR | 100926588 | 11/2009 |

OTHER PUBLICATIONS

Machine translation of KR 101212986 B1 (published on Dec. 18, 2012).*

* cited by examiner

Test system and conditions

1. Temperature/humidity chamber
2. Light source: 220V/500W/3200K bulb (Iwasaki)
3. Thermometer
4. Irradiation distance
5. Surface to be irradiated: surface
6. Surface to be measured: back surface
7. Irradiation time: 60 min
8. Temperature and humidity in chamber

FIG. 4

PREPARATION METHOD FOR MULTIFUNCTIONAL POLYESTER FIBRE

TECHNICAL FIELD

The present invention relates to a method for producing a multifunctional polyester fiber and a multifunctional polyester fiber produced thereby, and more particularly, to a method for producing a multifunctional polyester fiber having excellent thermal storage/insulation effects and excellent far-infrared emission properties, including uniformly mixing a polyester master batch chip, containing cesium tungsten oxide-based particles, with a general polyester chip and then melt-spinning the mixture, and to a multifunctional polyester fiber produced by the method.

BACKGROUND ART

With the development of technology, synthetic fibers have also been improved to have physical properties comparable to those of natural fibers, and thus synthetic fibers having various functionalities have been used. In particular, polyesters represented by polyethylene terephthalate have many excellent properties, and thus have been widely used not only for textile applications but also for industrial applications.

Recently, in the polyester textile industry, high value-added differentiated materials have been actively developed. In an effort to overcome the disadvantages of polyesters and develop new advantages, many studies focused on modifying the components of polyester polymers with other components or adding special additives to polyester polymers have been conducted.

As an example, European Patent No. 302141 discloses a polyester fiber having thermal storage and insulation properties, which contains zirconium carbide particles. However, zirconium carbide particles have a disadvantage in that they cannot provide fabric products having various colors because they have a gray or black color when being incorporated into blended yarns.

Meanwhile, Japanese Unexamined Patent Application Publication No. Hei 3-69675 discloses a technology for producing a staple fiber, which includes mixing a fiber-forming polymer with an oxide ceramic fine powder such as an alumina or zirconium oxide ceramic fine powder to prepare a master chip, mixing the master chip with a general polyester chip, and spinning the mixture. The polyester fiber that is produced by this method has good whiteness, but has a problem in that the production of filaments is difficult because the dispersibility of a large amount of ceramic particles is poor.

Korean Patent No. 926588 discloses a method for producing spun yarns, which includes uniformly mixing tungsten oxide particles having a particle diameter of 1-800 nm and a hexagonal crystalline structure with a polyester resin to prepare a master batch, melt-spinning the master batch, drawing the melt-spun filaments to produce multifilament yarns, and cutting the multifilament yarns into staple yarns. However, tungsten oxide particles aggregate into large particles during the production of the master batch and the production of the yarns, and thus cause fatal problems in that the spinnability of the master batch becomes poor and appearance defects such as fluffs or loops occur. Accordingly, the yarns containing the tungsten oxide particles are actually impossible to use as long fibers, and should be used only as spun staple fibers.

DISCLOSURE

Technical Problem

The present invention has been made in order to overcome the above-described problems of conventional art, and an object of the present invention is to provide a method for producing a multifunctional polyester fiber, in which the multifunctional polyester fiber can be produced as a high multifilament yarn having a single-yarn fineness of 1 denier or less and has excellent thermal storage and insulation properties and excellent dyeability and far-infrared emission properties while exhibiting excellent spinning processability and yarn processability.

Another object of the present invention is to provide a multifunctional polyester fiber having excellent thermal storage and insulation properties and excellent far-infrared emission effects while having high color-developing properties during dyeing due to its high whiteness.

Technical Solution

In order to accomplish the above objects, an aspect of the present invention is directed to a method for producing a multifunctional polyester fiber, the method including:

melt-mixing cesium tungsten oxide-based composite metal oxide particles with polyester to prepare a master batch chip;

mixing the prepared master batch chip with a general polyester chip to prepare a mixture, and spinning the mixture using a spinning nozzle having a sectional shape that enables the fiber to have a hollow sectional shape, thereby forming a spun fiber; and cooling the spun fiber using a cooling device including a rotational outflow quenching unit and a nozzle-warming heater.

In order to accomplish the above objects, another aspect of the present invention is directed to a multifunctional polyester fiber having excellent thermal storage/insulation properties, which contains 0.01-2 wt % of cesium tungsten oxide-based composite particles having an average particle size of 0.3-1.8 μm, and has a single-yarn fineness of 0.5-1 denier, a yarn section including a hollow portion, a hollow ratio of 10-40%, and a far-infrared emissivity of 0.88 or higher at a wavelength range from 5 to 20 μm.

Advantageous Effects

According to the present invention, a polyester fiber that emits far-infrared rays from far-infrared-emitting particles distributed in the fiber to provide thermal insulation and health promotion effects, includes an air layer to exhibit excellent thermal storage/insulation properties and exhibits excellent processability and dyeability can be produced as a high-multifilament yarn having a fineness of 1 denier or less.

BEST MODE

Hereinafter, the present invention will be described in greater detail with reference to the accompanying drawings.

In a method for producing a functional polyester fiber according to an embodiment of the present invention, a polyester master batch chip containing cesium tungsten oxide-based composite metal particles having far-infrared emission properties is melt-mixed with a general polyester chip, and the mixture is spun. To improve the thermal insulation function of the fiber, the mixture is spun using a spinning nozzle having a special section that enables the fiber to contain an air layer.

In the present invention, a separate master batch chip including a polymer and far-infrared emitting ceramic powder is prepared, and is then mixed-spun to produce a fiber having thermal storage/insulation and far-infrared emission properties. To maximize the content of an air layer in a yarn and a fabric product in order to maximize the far-infrared emission and thermal insulation effects, the shaped yarn having the thermal storage/insulation and far-infrared emission properties is produced to have a C-shape section.

In the method according to an embodiment of the present invention, cesium tungsten oxide-based composite metal oxide particles are melt-mixed with polyester to prepare a polyester master batch chip, and then the prepared master batch chip is mixed with a general polyester chip. The chip mixture is spun using a spinning nozzle having a sectional shape that enables the spun fiber to have a hollow sectional shape. The spun fiber is cooled using a cooling device including a central rotational outflow quenching unit and a nozzle-warming heater, thereby producing a multifunctional polyester fiber. Hereinafter, each step of the method will be described in greater detail.

Master Batch Chip Preparation Step

Cesium tungsten oxide-based composite metal oxide particles that are used as an additive for thermal storage and insulation in the present invention are made of a composite metal oxide composed of 100 parts by weight of $WO_3$, 1-15 parts by weight of $Cs_2O$, 0.1-2 parts by weight of $Sb_2O_3$, and 0.01-1 part by weight of $SnO_2$. 5-20 parts by weight of this composite metal oxide is mixed with 100 parts by weight of one or two organic solvents selected from among alkyl cellosolve solvents, and 1-2 parts by weight of polymethylmethacrylate (dispersing agent 1) and/or 5-115 parts by weight of magnesium or calcium lauryl sulfate (dispersing agent 2), and is stirred and milled to a particle size of 100 μm or less using a rotary ring milling machine, i.e., a high-viscosity disperser, at a temperature of 35° C. or below for 5 hours to prepare a dispersion. Thereafter, the dispersion is powdered into granules using a spray-type dryer at 110° C. The powdered cesium tungsten oxide-based composite metal oxide particle additive usually has an average particle size of 50 μm or less as measured by an electron microscope. Then, the particles are further milled using an air jet mill to thereby prepare powder having an average particle size of 0.5 μm or less.

In the preparation of a master batch chip, a polyester chip having high viscosity (intrinsic viscosity: 0.70-0.80 dl/g) is used in order to mitigate the decrease in spinning processability and physical properties caused by a decrease in viscosity. The high-viscosity polyester chip is mixed with 10-30 wt % of cesium tungsten oxide-based composite metal oxide particles having an average particle size of 0.5 μm or less, and is melt-extruded using a single-screw extruder or a twin-screw extruder at 260~300° C., thereby preparing a master batch chip.

In the master batch chip, the cesium tungsten oxide-based composite metal oxide particle additive that had an average particle size of 0.5 μm or less as measured by an electron microscope has an average particle size of 0.05-0.1 μm. This suggests that the composite metal oxide particles were secondarily dispersed by dispersing agent 1 and dispersing agent 2 during the melt extrusion process. In order to produce a high multifilament yarn having a single-yarn fineness of 1 denier or less, it is necessary to control the particle size of the cesium tungsten oxide-based composite metal oxide particles within the above-specified range. If the size of the cesium tungsten oxide-based composite metal oxide particle is smaller than 0.05 μm, the functionality of the particles will be reduced, and it will be difficult to ensure the dispersibility of the particles. In contrast, if the particle size is larger than 0.1 μm, problems will arise in terms of spinning processability, particularly the spinning processability of high multifilament yarns having a single-yarn fineness of 1 denier or less.

In the present invention, the number-average distribution of the number of particles having a size smaller than the average size in the cesium tungsten oxide-based composite metal oxide particles is preferably 50-65%. The particle size distribution of inorganic particles has a direct influence on the dispersibility thereof during mixing. If the distribution of particles having a size smaller than the average size in the cesium tungsten oxide-based composite metal oxide particles is excessively broad, problems may arise in that the particles aggregate to cause a decrease in spinning processability and an increase in pressure. On the other hand, if the distribution of particles having a size smaller than the average size is excessively narrow, the particles will aggregate rapidly due to an attraction between the molecules, resulting in a considerable decrease in spinning processability. Accordingly, the distribution of particles having a size smaller than the average size in the cesium tungsten oxide-based composite metal oxide particles is preferably within the above-specified range in order to prevent the aggregation of the particles.

Melting and Mixing Step

Figure 2:
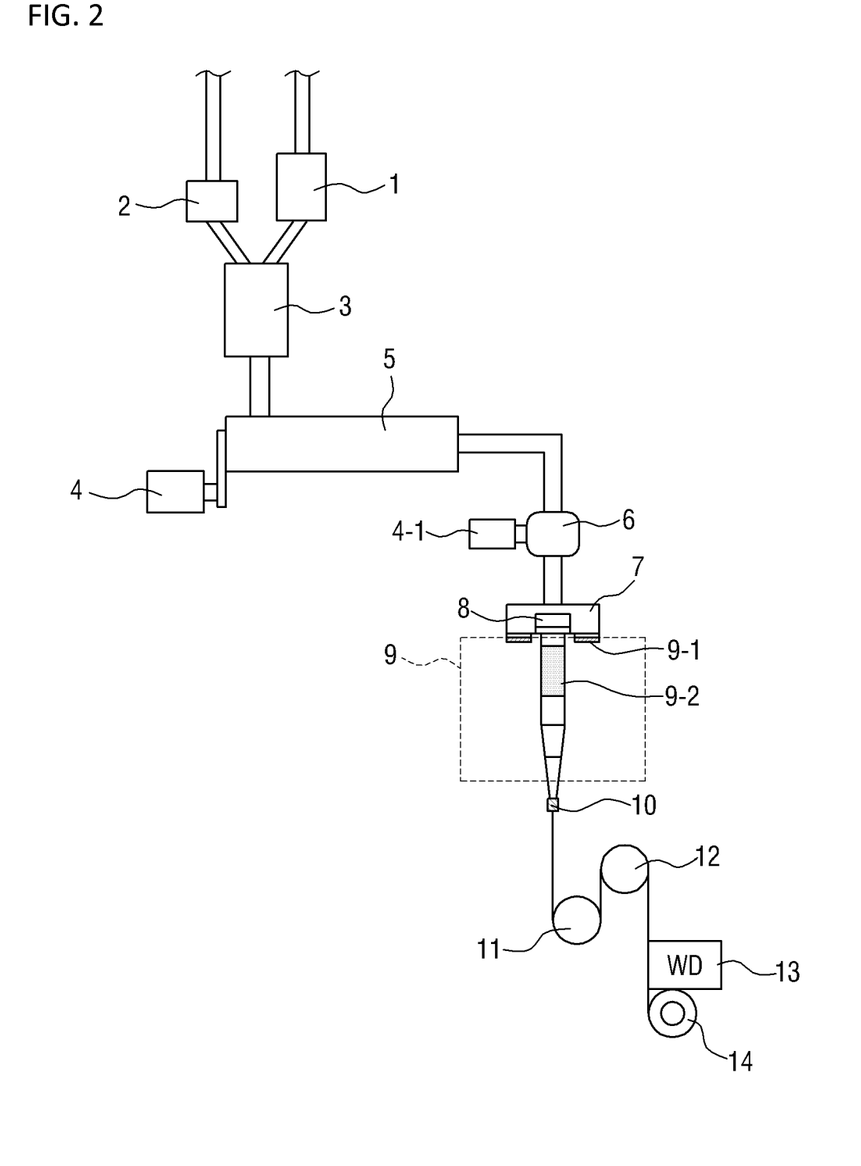
FIG. 2 is a schematic diagram of an apparatus for mixing, melting and spinning, which may be used to practice the present invention.

FIG. 2 is a schematic diagram of an apparatus for mixing and melt-spinning, which may be used to practice the present invention. Referring to FIG. 2, in a mixing and melting step, the polyester master batch chip containing the cesium tungsten oxide-based composite metal oxide particles having far-infrared emission properties is fed through a master batch chip silo 2, and a general polyester chip is fed through a polyester silo 1. The fed chips are uniformly mixed in a separate metering mixer 3, and fed into and melted in an extruder 5. To the extruder 5, a pump configured to send the melted material to a spinning nozzle is connected, and next to the extruder 5, a polymer melting pump 6 configured to melt the polymer material by heat and a pump 4-1 are disposed.

The master batch chip containing the composite metal oxide particles and the general polyester chip are mixed at a ratio ranging from 1:99 to 10:90.

The spun polyester fiber according to the present invention may contain modifiers and additives for imparting functionalities, including other far-infrared emitting ceramic material, a dispersion aid, a polymer compatibilizer, an antioxidant, a stabilizer, a flame retardant, a colorant, an antibacterial agent, and a UV absorber.

Spinning Step

After the master batch chip containing the composite metal oxide particles and the general polyester chip are mixed and melted as described above, the melted material is spun using a spinning nozzle 8, which is disposed in a spin block 7 and has a sectional shape enabling the spun fiber to have a shape capable of containing an air layer.

As an example of the spinning nozzle, a C-shaped spinning nozzle may be used so that the spun fiber may contain an air layer, but the spinning nozzle is not necessarily limited thereto. Conjugate yarn spinning nozzles enabling the spun fiber to contain an air layer may be used, including those that are hollow, cruciform, circular, semicircular, oval, D-shaped, of a sheath-core type, or of a crossbar type in its sectional shape.

Cooling Step

After the mixed melted polymer is spun using the spinning nozzle 8, a cooling step of cooling the spun polymer by passing it through a cooling device 9 is performed. In this case, the cooling device uses a rotational overflow quenching (ROQ) unit 9-2 and includes a nozzle-warming heater 9-1.

In the cooling step of the present invention, the rotational outflow quenching (ROQ) device of FIG. 2 is used. A single-sided cooling device has disadvantages in that fine yarns and shaped yarns are non-uniformly cooled due to the differences in cooling rate and cooling efficiency between a portion of the thread line, which is close to a cooling air blowing unit, and a portion of the thread line, which is distant from the cooling air blowing unit, resulting in yarn unevenness and variation in the physical properties of the yarns. However, when the rotational outflow quenching device is used, the non-uniform cooling of filaments can be minimized. In order to prevent spinning processability from being reduced due to a decrease in the nozzle surface temperature, which results from proximal cooling caused by the characteristic of the quenching device, a nozzle-warming heater 9-1 is disposed under the spinning nozzle.

Moreover, the distance between the spinning nozzle 8 and the nozzle-warming heater 9-1 during melt spinning is preferably 20-40 K (K: fiber flexibility index, and K=single-yarn fineness×shape factor). The reason for this is to control the cooling rate of yarns during spinning to thereby ensure the uniform sectional shape of the fiber and enhance the processability of the fiber. If the distance between the spinning nozzle and the nozzle-warming heater is shorter than 20 K, the cooling process will proceed rapidly, and thus the sectional shape of the fiber may become non-uniform and the processability of the fiber may be reduced. In contrast, if the distance is longer than 40 K, the cooling of the fiber will be slow, and thus the physical properties and sectional shape of the fiber may become non-uniform, thereby making the dyeability of the fiber non-uniform.

Fiber Drawing Step

In the fiber drawing step, the cooled polymer is drawn using a first godet roller 11 and a second first godet roller 12, thereby producing a polyester fiber having a single-yarn fineness of 0.5-1 denier, a hollow ratio of 20-80%, and a far-infrared emissivity of 0.88 or higher at a wavelength range from 5 to 20 µm. That is, the cooled polymer may be drawn between the first godet roller 11 and the second godet roller 12 at a certain draw ratio to produce a spin-draw yarn, or may be prepared as a partially oriented yarn without drawing, which may be prepared into a drawn yarn or false-twisted yarn by an additional drawing or false twisting process. For uniform drawings, the cooled polymer may also be oiled by a focused oiling unit disposed before the first godet roller 11. A yarn 14 produced by the spin-draw yarn (SDY) or partially oriented yarn (POY) process is wound around a winder 13. As mentioned above, the partially oriented yarn is subjected to an additional drawing or false twisting process to produce a final drawn yarn or false-twisted yarn, which is then wound.

Another aspect of the present invention is directed to a multifunctional polyester fiber produced by the method of the present invention. The polyester fiber of the present invention contains 0.01-2 wt % of cesium tungsten oxide-based composite particles having an average particle size of 0.3-1.8 µm, has a single-yarn fineness of 0.5-1 denier, has a yarn section including a hollow portion, and has a hollow ratio of 10-40%, and a far-infrared emissivity of 0.88 or higher at a wavelength range from 5 to 20 µm. In addition, since a thermal storage/insulation property measured by a lamp method is 3° C. or higher, the thermal storage/insulation effect of the polyester fiber is very excellent.

If the content of cesium tungsten oxide-based composite particles in the final fiber is lower than 0.01 wt %, the far-infrared emission property and thermal storage/insulation property of the fiber will be reduced, and if the content is higher than 2.0 wt %, improvement in the functionality of the fiber is not significant, and the spinning processability and physical properties of the fiber is considerably reduced. Accordingly, it is necessary to optimize the content of the cesium tungsten oxide-based composite particles in the fiber.

The ratio of a central hollow portion, in which an air layer is formed, in the polyester fiber of the present invention, is 10-40%, and preferably 20-30%. If the ratio of the hollow portion is lower than 10%, the desired thermal insulation effect of the air layer cannot be expected. In contrast, if the ratio of the hollow portion is higher than 40%, problem may arise in that the processability of the fiber in manufacturing processes is reduced, the wearing feeling of the fiber is excessively light, and the color development property of the fiber is reduced.

The functional polyester fiber of the present invention emits far-infrared rays from far-infrared-emitting particles distributed therein to provide thermal insulation and health promotion effects, and provides excellent thermal storage/insulation properties due to an air layer formed therein. Therefore, the fiber of the present invention may be used alone or in a mixture with a conventional fiber to manufacture a desired fabric product (woven or knitted fabric) according to a general method, and may be used as a fiber for winter clothes, ski suits, winter uniforms, blouses, coats, working clothes, curtains, etc.

MODE FOR INVENTION

Hereinafter, the present invention will be described in greater detail with reference to examples. These examples are for illustrative purposes, and the scope of the present invention is not limited by them.

Example 1

10 parts by weight of composite metal oxide particles composed of 100 parts by weight of $WO_3$, 6.0 parts by weight of $Cs_2O$, 0.45 parts by weight of $Sb_2O_3$ and 0.05 parts by weight of $SnO_2$ were mixed with 100 parts by weight of alcohol, 2 parts by weight of polymethylmethacrylate (dispersing agent 1) and 10 parts by weight of magnesium laurate or calcium laurate (dispersing agent 2), and stirred and crushed using a super revolution zirconia ball mill at a temperature of 30° C. for 5 hours to a particle diameter of 100 µm or less, thereby preparing a dispersion. The dispersion was spray-dried at 100° C. to provide powder having an average particle size of 50 µm. The powder was further ground by an air jet mill to provide particles having a size of 0.5 µm.

Figure 1:
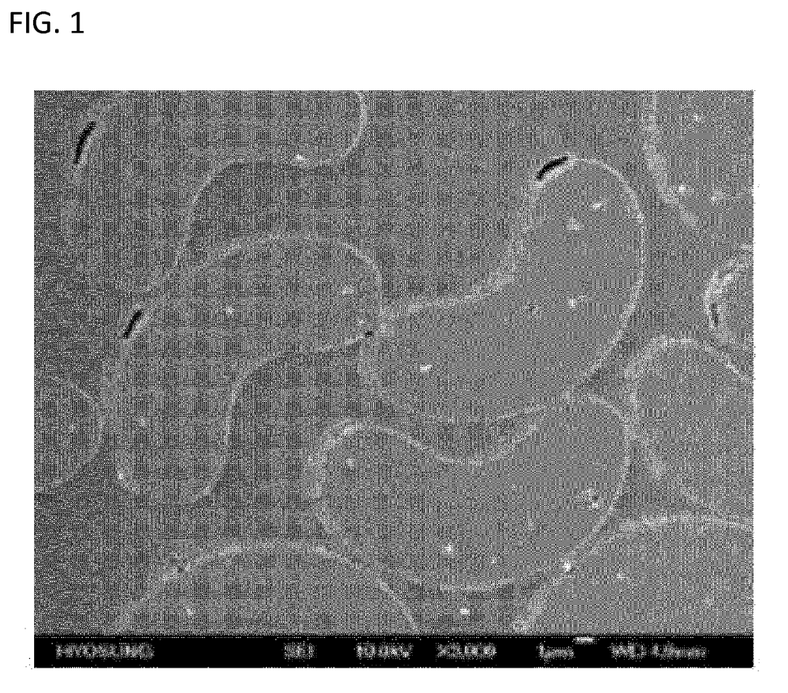
FIG. 1 is a photograph of the cross-section of a multifunctional polyester fiber produced according to the method of the present invention.

The obtained powder was melt-mixed with a general polyester (intrinsic viscosity: 0.64 dl/g) to make a master batch chip (hereinafter referred to as the "MB chip") having an inorganic content of 5 wt %. The MB chip was mixed with a general polyester (intrinsic viscosity: 0.64 dl/g) at a weight ratio of 4:96 so that the content of the inorganic particles in a fiber to be produced would be 0.2 wt %. Using the spinning apparatus of FIG. 2 including a rotational outflow quenching unit and a nozzle-warming heater, the mixture was spun at 295° C. and a speed of 2,450 m/min. Then, the spun yarn was false-twisted at a false twisting draw ratio of 1.63 using a conventional non-contact-type false twisting machine to thereby produce a 65-denier/108-filament false-twist yarn having a C-shaped sectional shape. The nozzle used was a C-shaped spinning nozzle so that the spun fiber could contain an air layer that enhances the thermal insulation function of the fiber. Also, the feeding of the master batch chip was performed using a feeding/mixing unit disposed before the melt extruder as shown in FIG. 2. A photograph of the cross-section of the produced fiber is shown in FIG. 1, and the physical properties, processability and functionality of the produced multifunctional polyester fiber were evaluated and are listed in Table 1 below.

Example 2

In the same manner as described in Example 1, a master batch chip having a cesium tungsten oxide-based composite metal oxide particle content of 10 wt % was prepared. The MB chip was mixed with a general polyester (intrinsic viscosity: 0.64 dl/g) at a weight ratio of 3:97 so that the content of the inorganic particles in a fiber to be produced would be 0.3 wt %. Using the spinning apparatus of FIG. 2, the mixture was spun at 295° C. and a speed of 2,600 m/min. Then, the spun yarn was false-twisted at a false twisting ratio of 1.65 using a conventional non-contact-type false twisting machine to thereby produce a 65-denier/72-filament false-twist yarn having a C-shaped sectional shape. The physical properties, processability and functionality of the produced multifunctional polyester fiber were evaluated and are listed in Table 1 below.

Comparative Example 1

Cesium tungsten oxide ($Cs_{0.33}WO_3$) powder was melt-mixed with a general polyester (intrinsic viscosity: 0.64 dl/g) to make a master batch chip having an inorganic content of 5 wt %. The MB chip was mixed with a general polyester (intrinsic viscosity: 0.64 dl/g) at a weight ratio of 4:96 so that the content of the inorganic particles in a fiber to be produced would be 0.2 wt %. Using the spinning apparatus of FIG. 2, the mixture was spun in the same manner as described in Example 1 to thereby produce a 65-denier/108-filament false-twist yarn having a C-shaped sectional shape. The physical properties, processability and functionality of the produced multifunctional polyester fiber were evaluated and are listed in Table 1 below.

Comparative Example 2

A general polyester chip (intrinsic viscosity: 0.64 dl/g) was spun using a conventional spinning apparatus at 295° C.
and at a speed of 2,600 m/min. Then, the spun yarn was false-twisted at a false-twist draw ratio of 1.65 using a conventional non-contact-type twisting machine to thereby produce a 65-denier/72-filament yarn having a circular sectional shape. The physical properties, processability and functionality of the produced polyester fiber were evaluated and are listed in Table 1 below.

<Methods for Evaluation of Physical Properties>

1) Average Particle Size of Inorganic Particles

The particle size and distribution of inorganic particles contained in a yarn were determined by randomly imaging the cross-section of the yarn 10 times with a scanning electron microscope (SEM) equipped with an image analyzer and then calculating the average size of the inorganic particles.

2) Evenness (Uster %)

The evenness (Uster %) of fiber was measured using Evenness Tester 80 of Keisokki Co.

3) Spinning Processability

Spinning processability was determined by operating a spinning machine for 120 hours to obtain 9 kg of wound fiber, and measuring the ratio of full cake to the total number of yarns produced.

4) False-Twisting Processability

False-twisting processability was determined by operating a false-twisting machine for 120 hours to obtain 3 kg of wound fiber and measuring the ratio of full cake to the total number of yarns produced.

5) Dyeability of False-Twist Yarns 3 kg of wound yarns (600 yarns) were knitted into a sock fabric and dyed, and the ratio of medium yarns (M ratio (%)) in the total yarns consisting of light yarns (L yarns), medium yarns (M yarns) and dense yarns (D yarns) was visually evaluated to determine the dyeability of the yarns.

6) Far-Infrared Emissivity (KFIA-FI-1005)

Far-infrared emissivity relative to a black body in a far-infrared emission region ($\lambda$=5-20 µm) was measured using an FT-IR Spectrometer at a temperature of 37° C.

7) Thermal Insulation/Insulation Property (Reference Lamp Method)

Figure 3:
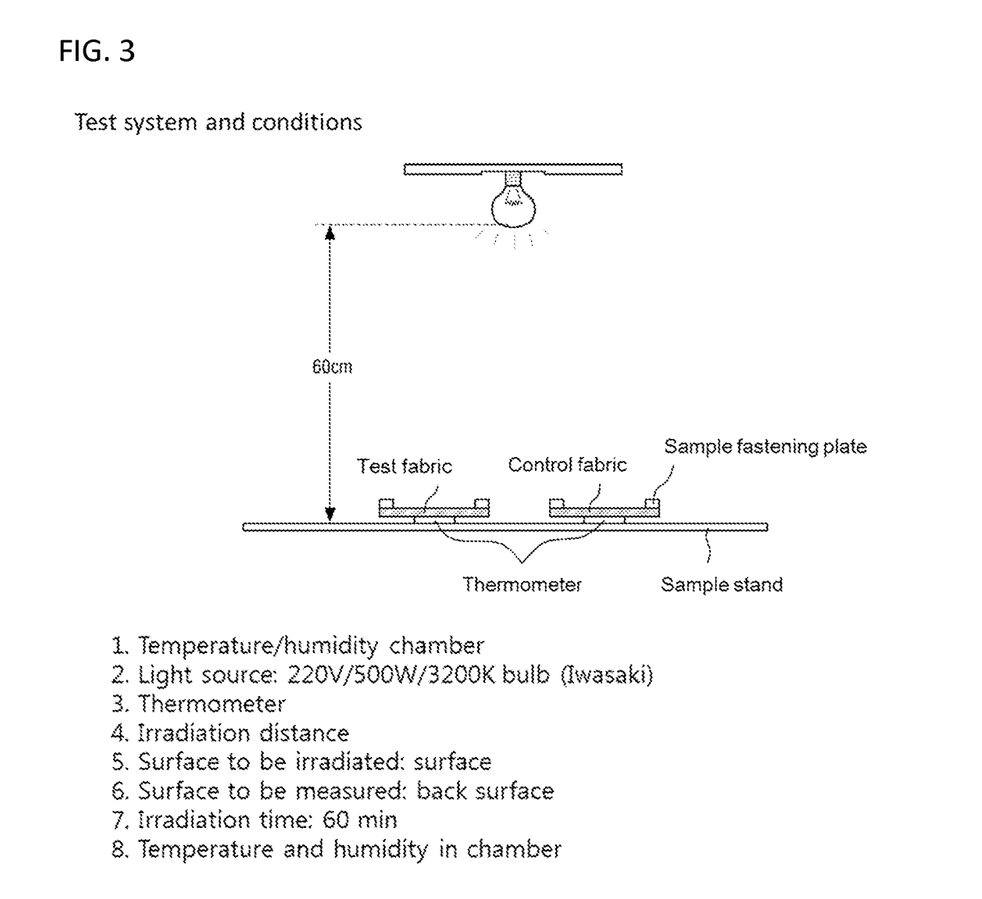
FIG. 3 is a schematic diagram of a system to measure thermal storage/insulation function in the present invention.

The system of FIG. 3 was used. A fabric sample having a width of 30 cm and a length of 30 cm was allowed to stand in an artificial climate chamber (temperature: 20±2° C.; relative humidity: 65±4%) for 2 hours. Then, a temperature sensor was attached to the lower surface of the fabric sample, and the fabric sample was irradiated with light from a 500 W light source located at a distance of 50 cm from the fabric sample while the temperature of the fabric sample was measured at intervals of 1 minute for 60 minutes. Then, calculation was performed as follows:

1) Temperature rise (° C.): temperature of fabric sample after light irradiation−temperature of fabric sample before light irradiation;

2) Thermal storage/insulation property (temperature (° C.)): Temperature rise of test sample−temperature rise of control sample

TABLE 1

|  | Example 1 | Example 2 | Comparative Example 1 | Comparative Example 2 |
|---|---|---|---|---|
| Average size (µm) of powdery functional inorganic particles | 2.5 | 2.5 | 2.5 | — |

TABLE 1-continued

|  | Example 1 | Example 2 | Comparative Example 1 | Comparative Example 2 |
|---|---|---|---|---|
| Average size (μm) of functional inorganic particles in master batch chip | 1.7 | 1.8 | 3.2 | — |
| Average size (μm) of functional inorganic particles in yarn | 1.3 | 1.5 | 3.6 | — |
| Content (wt %) of inorganic particles in fiber | 0.2 | 0.3 | 0.2 | — |
| Feeding of agent for dispersing functional inorganic particles | ○ | ○ | ○ | — |
| Feeding of MB | ○ | ○ | ○ | — |
| Spinning temperature (° C.) | 295 | 295 | 295 | 295 |
| Spinning speed (m/min) | 2,450 | 2,600 | 2,450 | 2,600 |
| False-twisting draw ratio | 1.65 | 1.63 | 1.63 | 1.65 |
| False twisting temperature (non-contact type; ° C.) | 230 | 230 | 230 | 230 |
| False-twisting speed (m/min) | 500 | 500 | 500 | 500 |
| Denier/filament number | 65/108 | 65/72 | 65/108 | 65/72 |
| Evenness (Uster %) | 0.9 | 0.9 | 1.4 | 0.8 |
| Spinning processability (full cake ratio; %) | 97 | 96 | 56 | 97 |
| False-twist processability (full cake ratio; %) | 96 | 96 | 60 | 97 |
| Dyeability (M ratio; %) of false-twist yarns | 97 | 97 | 76 | 98 |
| Far-infrared emissivity | 0.886 | 0.888 | 0.865 | 0.837 |
| Temperature rise (° C.) | 18.2 | 18.8 | 17.2 | 13.9 |
| Thermal storage/insulation property (temperature; ° C.) | 4.3 | 4.9 | 3.3 | 0 |
| Sectional shape | C shape | C shape | C shape | ○ shape |

As can be seen from the results in Table 1 above, the polyester fiber produced by the method of the present invention exhibited a high far-infrared emissivity of 0.886-0.888 at a wavelength of 5-20 μm (far-infrared emission region), an excellent thermal storage/insulation property of 3° C. or higher, and very excellent spinning processability, false-twist processability and false-twist yarn dyeability of 95% or higher.

Figure 4:
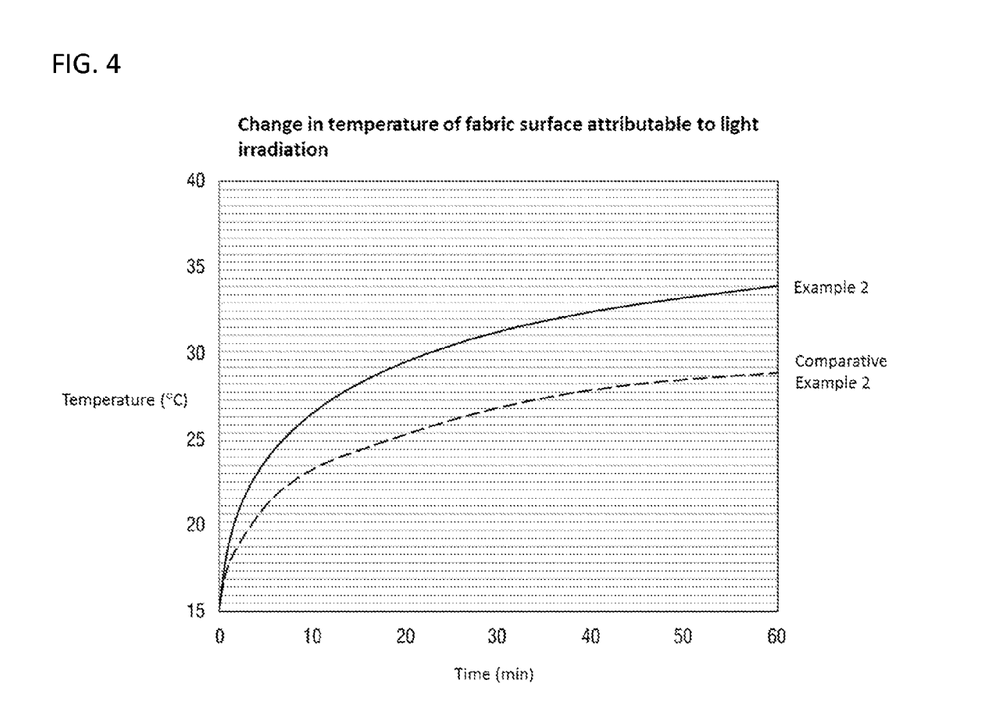
FIG. 4 is a graph illustrating the results of measuring the thermal storage/insulation properties of dyed knitted sock fabrics including fibers produced in the present invention.

The changes in surface temperature of dyed knitted sock fabrics (produced in Example 2 and Comparative Example 2) caused by light irradiation are illustrated in FIG. 4 in the form of a graph. Referring to FIG. 4, it can be seen that the surface temperature of the fabric of Example 2 was about 3-6° C. higher than that of the fabric of Comparative Example 2, and thus the fabric of Example 2 has an increased thermal storage/insulation effect.

Although the preferred embodiments of the present invention have been described in detail by way of example, this description is intended merely for the description and disclosure of exemplary embodiments of the present invention. It will be readily understood by those skilled in the art that various changes, modifications and alterations can be made from the above description and the accompanying drawings without departing from the scope and spirit of the invention. Accordingly, such modifications or variations should be construed as falling within the claims of the present invention.

INDUSTRIAL APPLICABILITY

The multifunctional polyester fiber according to the present invention and a fabric product including the same have excellent far-infrared emission properties, thermal storage/insulation properties and spinning processability, and thus can be used as high value-added materials.

The invention claimed is:

1. A method for producing a multifunctional polyester fiber, the method comprising:
   melt-mixing cesium tungsten oxide-based composite metal oxide particles with polyester to prepare a master batch chip;
   mixing the prepared master batch chip with a general polyester chip to prepare a mixture, and spinning the mixture using a spinning nozzle having a sectional shape that enables the fiber to have a hollow sectional shape, thereby forming a spun fiber; and
   after the spinning, cooling the spun fiber using a cooling device including a rotational outflow quenching unit and a nozzle-warming heater,
   wherein the cesium tungsten oxide-based composite metal oxide particles are composite metal oxide particles composed of 100 parts by weight of $WO_3$, 1-15 parts by weight of $Cs_2O$, 0.1-2 parts by weight of $Sb_2O_3$, and 0.01-1 part by weight of $SnO_2$ 0.01.

2. The method of claim 1, wherein the master batch chip containing the cesium tungsten oxide-based composite metal oxide particles contains 10-30 wt % of the cesium tungsten oxide-based composite metal oxide particles.

3. The method of claim 1, wherein the composite metal oxide particles have an average particle diameter of 0.5 μm or smaller, and a ratio of a number of particles having an average particle size of 0.05-0.1 μm to a total number of the particles in the fiber is 50-65%.

4. The method of claim 1, wherein the master batch chip containing the composite metal oxide particles are mixed with the general polyester chip at a weight ratio ranging from 1:99 to 10:90.

5. The method of claim 1, wherein a section of the spinning nozzle having the sectional shape that enables the fiber to have the hollow sectional shape has a hollow, cruciform, circular, semicircular, oval, C, D, sheath-core type or crossbar shape.

* * * * *